(12) United States Patent
Shin

(10) Patent No.: US 8,591,437 B2
(45) Date of Patent: *Nov. 26, 2013

(54) ADVANCED HANDABLE SKIN CARE DEVICE AND OPERATING METHOD THEREOF

(75) Inventor: Hwan-Ho Shin, Jeollanam-do (KR)

(73) Assignee: Lotts Co. Ltd., Gangnam-Gu, Seoul (KR)

( * ) Notice: Subject to any disclaimer, the term of this patent is extended or adjusted under 35 U.S.C. 154(b) by 578 days.

This patent is subject to a terminal disclaimer.

(21) Appl. No.: 12/872,129

(22) Filed: Aug. 31, 2010

(65) Prior Publication Data

US 2011/0125069 A1 May 26, 2011

Related U.S. Application Data

(63) Continuation of application No. 10/561,061, filed on Jan. 18, 2007, now Pat. No. 7,922,675.

(30) Foreign Application Priority Data

| Jun. 17, 2003 | (KR) | .................. 10-2003-0039255 |
| Jun. 17, 2003 | (KR) | .................. 20-2003-0019116 U |
| Jun. 17, 2003 | (KR) | .................. 20-2003-0019117 U |
| Jun. 17, 2003 | (KR) | .................. 20-2003-0019118 U |

(51) Int. Cl.
*A61H 1/00* (2006.01)

(52) U.S. Cl.
USPC .................... 601/15; 601/2; 601/21

(58) Field of Classification Search
USPC ........ 601/2, 15, 17, 18, 20, 21, 46, 70, 72, 80
See application file for complete search history.

(56) References Cited

U.S. PATENT DOCUMENTS

| 5,690,608 | A | * | 11/1997 | Watanabe et al. ............... 601/19 |
| 6,135,126 | A | | 10/2000 | Joshi |
| 6,176,640 | B1 | | 1/2001 | Nishimura et al. |
| 6,443,915 | B1 | * | 9/2002 | Hwang .......................... 601/15 |

FOREIGN PATENT DOCUMENTS

| KR | 2019940022479 | 9/1994 |
| KR | 100159142 | 8/1998 |
| KR | 100358296 | 10/2002 |

* cited by examiner

*Primary Examiner* — Quang D Thanh
(74) *Attorney, Agent, or Firm* — GWiPS

(57) ABSTRACT

An apparatus for maintaining and supplying stable power to a skin care device comprising a DC-DC converting unit (20) for escalating the voltages from a charged battery power source (1), a skin-stimulating unit (50) with a supersonic element or an ion-inducing element, a switch unit (30) having a main switch (SW1) and various functional switches, an LCD displayer (40) for indicating various operating modes, a CPU (2) for controlling each component, a main switch initiating unit having a function when the main switch (SW1) is turned on, the CPS is activated by a switching signal inputted to an analogue input port from said CPU, the first switch unit (31) is activated by the CPU through an analogue output port, then the FET (D4) is switched to supply battery power to the DC-DC-converting unit (20), and a function of the PWM control signal, which prolongs the switching-on stage for gradually increasing the voltage up to the operating voltage during the step-up stage, and inversely shortens the switching-off stage for gradually decreasing the operating voltage during the step-down stage. A strength-adjusting switch (SW3) for controlling the strength of output voltage of the DC-DC converting unit (20), and a mode switch (SW2) for operating various modes of supersonic vibrations controlled by each vibrating frequency. An LED displayer being equipped with a minimum number of connecting pins for indicating various operating modes. Each LED is independently activated to turn on and off according to each signal of the input-output terminal from a controlling unit of the CPU.

4 Claims, 15 Drawing Sheets

ADVANCED HANDABLE SKIN CARE DEVICE AND OPERATING METHOD THEREOF

CROSS-REFERENCE TO RELATED APPLICATIONS

This is a continuation of pending prior U.S. patent application Ser. No. 10/561,061 filed Jan. 18, 2007, now U.S. Pat. No. 7,922,675 by Hwan-Ho SHIN for Advance Handable Skin Care Device and Operating Method thereof. The above-identified patent application is hereby incorporated herein by reference.

BACKGROUND

1. Field of the Invention

The present invention relates to an improved skin care device equipped with a supersonic vibrator. More particularly, the supersonic skin care device employs a software control means for maintaining and supplying stable electricity without using a DC-DC converter.

2. Description of the Prior Art

According to the improved feature of the present invention, the supersonic skin care device is equipped with a starting device, especially a contact switching device for a supersonic, vibrating bowl.

As the third feature of the present invention, the skin care device is equipped with operating functions of various modes, and intensities of strong to weak control means, depending on the variation of the frequency.

Further, according to the fourth feature of the present invention, the skin care device is equipped with an energy saver function that automatically increases vibration strength when a user brings the vibrating plate of the skin care device to touch the user's skin.

According to the fifth feature of the present invention, the skin care device is equipped with a displayer, which has a minimum number of conducting pins.

The published Korean Patent No. 2002-0038818 disclosed a conventional, portable skin care device comprising a DC-DC converter as a power supply device to increase the voltages from the charging power. But the DC-DC converter is expensive and necessitates an increase in production cost. Further, if the electric voltage is rapidly increased by the DC-DC converter, it causes an interruption in current in the skin care device, which wastes energy.

The second conventional skin care device has a disadvantage in that it wastes energy by distributing power to all of the components of the circuits and the CPU, activating even those components which do not need to be operated, by turning on the main switch.

Another published patent, Korean Patent No. 2002-0085919, discloses an improved ionized skin care device for utilizing an ion effect and a method for controlling the same. Because this device uses several different voltages to operate grouped circuits inside the device, it is inconvenient for maintaining a consistent voltage. Energy is wasted when transforming power supply voltages. When a user turns on the main switch, power is supplied to the all of the components of grouped circuits as the standard voltage (Vcc).

For example in the above conventional device, 5V of standard voltage (Vcc) is used to activate the circuit, and 10-15V is required to operate the supersonic vibrator. If the voltage is suddenly increased by the DC-DC converter to initiate the supersonic vibrator, it causes the device to power down momentarily due to an overflow of power.

The third type of conventional supersonic vibrating skin care device has various modes of functioning, i.e., a cleaning mode, a supersonic vibrating mode and a skin-stimulating mode. An additional mode of ion injection may be included.

However, most conventional skin care devices use frequency variation to control the vibrating strength without altering the voltages. Therefore, most present conventional skin care devices are limited in the amount of adjustment of the strength of vibration.

The fourth type of conventional supersonic vibrating skin care device has adopted a ready-to-use function. If a user turns on the switch of the skin care device, the voltage of the device is increased up to operation mode regardless the user's intended usage. Thus, energy is wasted by unnecessarily idling, the vibrating device. It also does not provide a sensing device to sense whether the skin care device is contacting a user's skin.

The fifth type of conventional portable skin care device has an LED displayer that is operable by a CPU. This device is equipped with various modes of operating stages. Thus, a plurality of connecting terminals is required to display the various modes and steps in the LED displayer.

SUMMARY OF THE INVENTION

An objective of the present invention is to provide an improved skin care device adopting a software control means for gradually increasing or decreasing voltages at the initial or end of operation, and maintaining a stable supply of electricity without using a DC-DC converter. Unlike a home-use skin care device, which is plugged into a wall outlet through an adapter, the portable skin care device uses a battery as a main power source. Thus, it is essential to provide a stable power supply for the portable skin care device.

Another objective of the present invention is to provide a skin care device adopting a power control means to effectively maintain a power supply and prevent the unnecessary consumption of energy. When the skin care device is switched on, only the main CPU is actuated until an additional control signal is received to operate the next step.

The third objective of the present invention is to provide a skin care device having various modes controlling the vibrating strength by controlling not only frequency variation but also voltage alteration. Further, the strength of vibration may be controlled by gradually varying voltages using a software control means without using a DC-DC converter.

Still other objective of the present invention is to provide a skin care device equipped with a sensing device to detect skin contact for protecting the skin from possible burning due to accidental overheating or electric discharging. It also equipped with a function to save energy by reducing the unnecessary idling of the device.

The fourth objective of the present invention is to provide a skin care device equipped with a supersonic vibrating feature, adopting a ready-to-use function. When the main switch is turned on, the standby step of voltage is activated until the sensor detects that the device is touching a user's skin. When the sensor detects the skin touch, the strength of vibration is gradually increased up to operation mode. Therefore, it saves energy by preventing the unnecessarily idling of the vibrating device.

The fifth objective of the present invention is to provide a skin care device equipped with an LED displayer, operable by a CPU, which has a minimum number of connecting terminals required to display various modes and steps.

According to the first function of the present invention, the skin care device comprises a DC-DC converting unit (20) for escalating voltages from the charged battery power source, a skin-stimulating unit (50) for generating the supersonic element or ionizing inductor, a switch unit (30) with a main switch and individual unit switches, an LCD displayer (40) for indicating the operating mode, and a CPU (2) for controlling all of the above components.

A method for maintaining a stable power supply comprises the following steps: (a) starting a pulse width-measuring program (PWM_CHECK) to set a certain pulse width (S1) and to check whether the pulse width is correctly operating within the controlled width (S2). (b) If the detected pulse is the same as the setting width ('PWM OK FLAG'=1), the process is returned to continue the operation. If the detected pulse is not the same as the setting width, the current operating width ('PWM_PUF) is compared with the setting width ('PWM_TARGET) (S3). (c) If the compared value of the operating and setting widths has no difference ('PWM_PUF–'PWM_TARGET=0), then the process is returned to continue the operation. Otherwise, a subsequent step for adjusting the PWM is initiated. (c1) The duty ratio determines whether the duty ratio of the pulse width is larger than that of the setting width (S4). (c2) If the detected duty ratio of the pulse width is smaller than that of the setting width, the duty ratio of the setting width is increased by the difference in the PWM value between the detected duty ratio and the setting duty ratio. This is the step-up stage (S7). (c3) If the detected duty ratio of the pulse width is larger than that of the setting width, the duty ratio of the setting width is decreased by the difference in the PWM value between the detected duty ratio and the setting duty ratio. This is the step-down stage (S8).

The skin care device of the present invention comprises a DC-DC converting unit (20) for escalating the voltages from the charged battery power source, a skin-stimulating unit (50) for generating the supersonic element or ionizing inductor, a switch unit (30) with a main switch and individual unit switches, an LCD displayer (40) for indicating the operating mode, and a CPU (2) for controlling each component. The DC-DC converting unit (20) consists of a couple of voltage-measuring units (R2, R3) and a switching element (D3) for controlling the pulse width according to the duty ratio signal through a PWM control terminal (10) from the CPU.

The present skin care device equips a PWM control signal function, which prolongs the switching-on stage for gradually increasing the voltage until it reaches the operating voltage at the step-up stage, and inversely shortens the switching-off stage for gradually decreasing the operating voltage at the step-down stage.

Further, the present skin care device equips a safety control signal function, which gradually increases the operating voltage when it senses that the device is touching a user's skin, and rapidly shuts off the power when it detects an unusual operation, overheating or an electric hazard. These functions are also applied to the portable skin care device.

Regarding the second embodiment of the present invention, the skin care device comprises a power control system with a main starting switch, a DC-DC converting unit (20, 20', 120) for escalating the voltages from the charged battery power source (1, 101), a skin-stimulating unit (50, 150) for generating the supersonic element or inducing the ionized element, a switch unit (30, 130), an LCD displayer (40, 140) for indicating the operating mode, and a CPU (2, 102) for controlling each component. When the main switch (SW1) is turned on, a switching signal is input by an analogue terminal of the CPU for activating the first switch units (31, 31' 131). Then, the FET (D4) turns on and activates the DC-DC converting unit (20, 20', 120) to escalate the voltage from the charged battery power.

Preferably, the switch in the signal (SW_IN) of the main switch is input to an analogue terminal (AN5) of the CPU (2) through the second switch unit (32). The output of the first switch unit (31, 131) from the CPU is activated by switching the phototransistor that activates the photo-coupler (ISO1) for turning on the FET (D4).

Hopefully, the DC-DC converting unit (20) consists of voltage-measuring units and a switching element for controlling the pulse width according to the duty ratio signal through the PWM from the CPU. The PWM signal controls the switch-activating time to gradually increase the voltage until it reaches the operating voltage at the step-up stage, and inversely decreases the voltage by shortening the switching time at the step-down stage.

According to the third objective of the present invention, a supersonic skin care device comprises a DC-DC converting unit (20) for escalating the voltages from a charged battery power source (1), a supersonic stimulating unit (50) for generating supersonic vibrating, a switch unit (30), an LCD displayer (40) for indicating the operating modes, and a CPU (2) for controlling the overall components. The CPU also controls the output voltage strength of the DC-DC converter by operating an activating switch (SW3) through the PWM control terminal (10). The various modes controlled by different vibrating frequencies are generated through a mode switch (SW2) in the switch unit.

The DC-DC converting unit (20) comprises a pair of voltage-measuring units (R2, R3) and a switching element (D3) activated by software to control the pulse width according to the duty ratio signal through the PWM control terminal (10) of the CPU.

This supersonic skin care device is equipped with a sensing device (60) for detecting skin contact to automatically escalate the output of supersonic vibration. This supersonic skin care device is also equipped with a heat-sensing unit (70) for automatically shutting down power when it detects abnormal overheating, so that it is possible to protect the skin from burning.

The heat-sensing unit (70) consists of a first heat sensor (71) for detecting the surface temperature of the vibrating plate and a second heat sensor (72) for detecting the temperature of the vibrating element (54) and the switching element of the supersonic vibrator.

To implement the fourth objective of the present invention, the supersonic vibrating device comprises a voltage amplifier (51) for amplifying voltages according to control signals, a supersonic vibrator (ULTRA1) activated by the amplified voltage, a resonance unit (53) for resonating with a free vibration that occurs when a pulse is accessed to the amplified voltage, a vibration-generating unit (54) attached to the resonance unit (53), a vibrating unit (52) for vibrating the supersonic vibrator by power transmitted from the vibration-generating unit (54), and a skin contact sensing unit (60) for sensing skin contact and feeding back the signals to the vibration-generating unit (54).

The skin contact sensing unit (60) comprises a current-sensing unit (61) connected to the vibration-generating unit (54) and an amplifier (62) for amplifying and transmitting the sensed signal to the control unit.

The supersonic skin care device further comprises a supersonic vibration-generating unit, a CPU for monitoring the control signals, a DC-DC converter (20) for controlling the strength of output by the PWM control signal and a display unit (40) for indicating skin contacting status.

To implement the fifth objective of the present invention, a skin care device is equipped with a function of LED displaying with a minimum number of connecting terminals to display various modes of operation.

The CPU has a first input-output terminal (RB2) connected in parallel to a second input-output terminal (RB3), but first and second LEDs (D6, D7 refer FIG. 3) are connected in opposite directions from each other. The second input-output terminal (RB3) is connected in parallel to a third input-output terminal (RC0), but third and fourth LEDs (D8, D9 refer FIG. 3) are connected in opposite directions from each other. The third input-output terminal (RC0) is connected in parallel to a fourth input-output terminal (RC1), but fifth and sixth LEDs (D11, D13 refer FIG. 3) are connected in opposite directions to each other. A seventh LED (D14 in FIG. 3) is connected between the first input-output terminal (RB2) and the fourth input-output terminal (RC1).

Each LED is independently activated to switch on and off according to the signal of each input-output terminal from the controlling device of the CPU.

The first to sixth LEDs are usually used for adjusting the strength of modes, but the seventh LED is for displaying the status of the skin care device operation.

DRAWINGS

DETAILED DESCRIPTION

In order to achieve the above objectives, the present invention is described, along with the accompanying detailed drawings.

Figure 5:
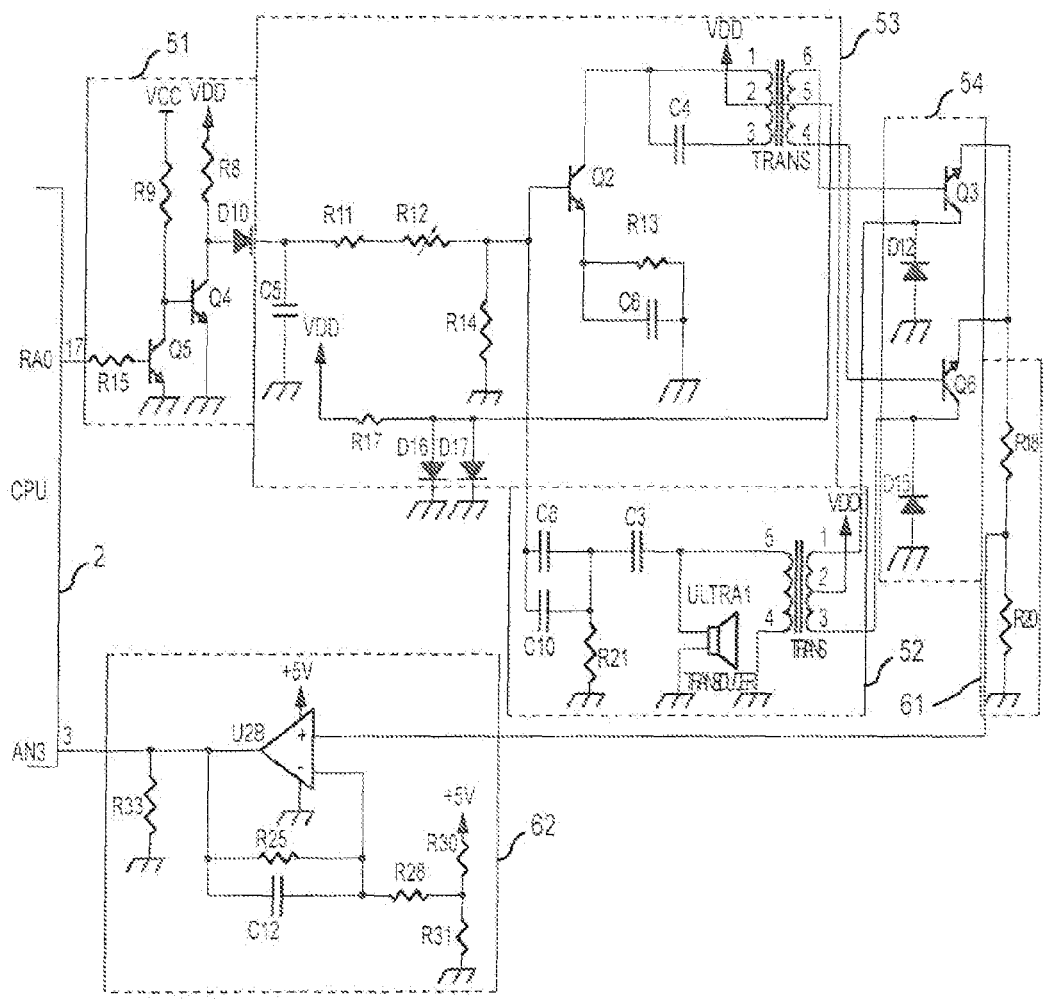
FIG. 5 is a detail of a circuit of a supersonic vibrating unit of the skin care device according to the present invention.
Figure 6:
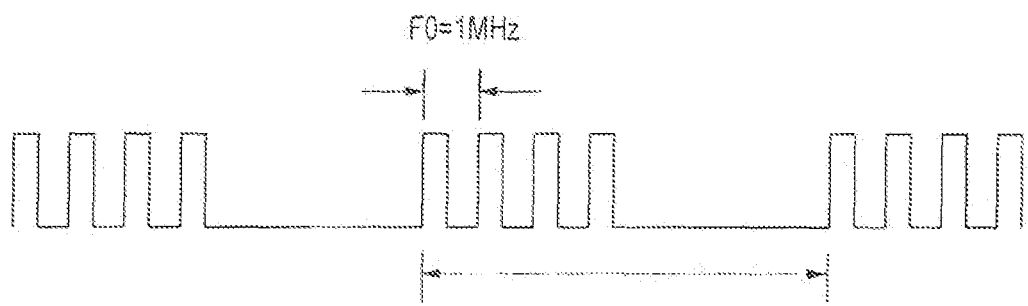
FIG. 6 illustrates a pulse wave generated by the supersonic vibrating unit of the skin care device according to the present invention.
Figure 7:
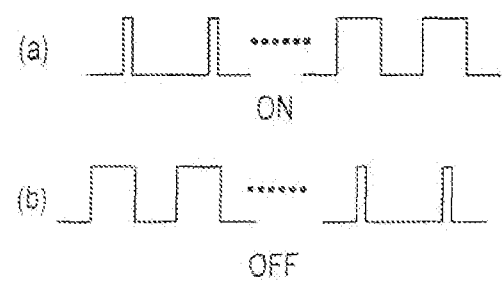
FIG. 7 is a pulse wave used to control the skin care device of the second embodiment of the present invention.

Referring to FIGS. 1 to 7, an overall block diagram of the supersonic skin care device (FIG. 1), a detail of a circuit of a power source and a switch unit (FIG. 2), a detail of a circuit of the output unit (FIG. 3), a detail of a circuit of the heat-detecting unit (FIG. 4), and a detail of a circuit of the supersonic vibrating unit (FIG. 5) are presented. It further illustrates a pulse wave being generated by the supersonic vibrating unit (FIG. 6) and an application of the pulse wave for controlling the skin care device (FIG. 7).

Figure 1:
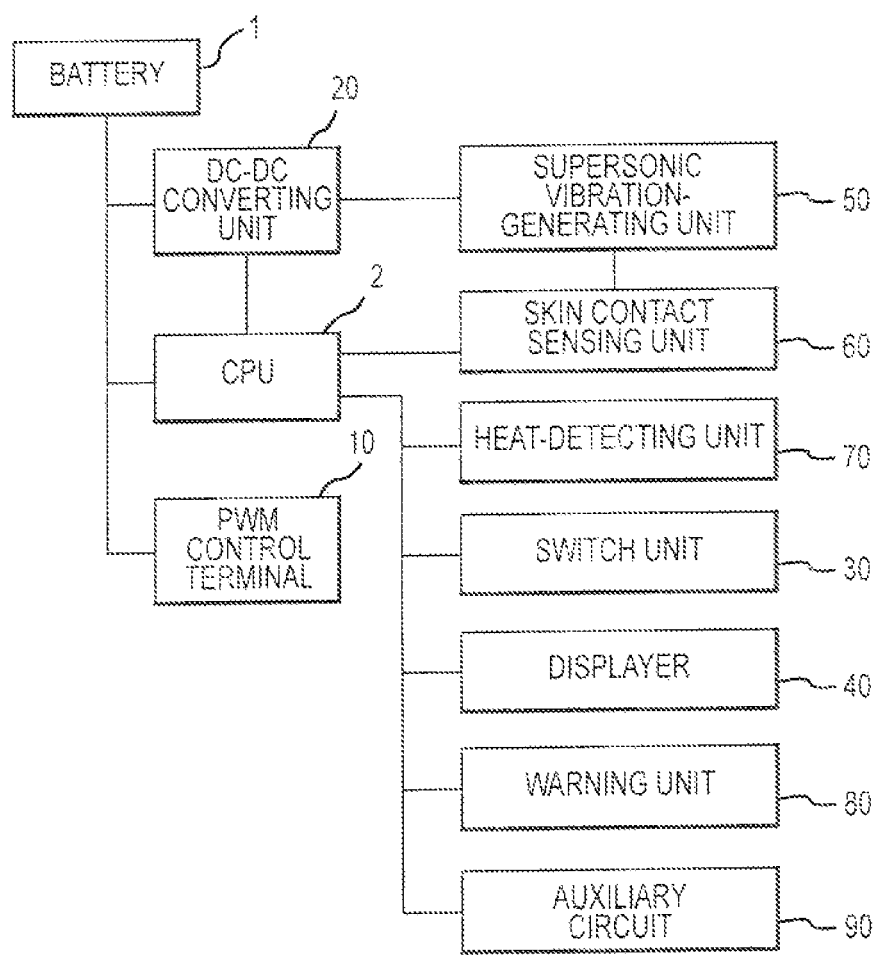
FIG. 1 is an overall block diagram of a supersonic skin care device according to the present invention.

As shown in FIG. 1, an improved skin care device comprises a DC-DC converting unit (20) adopting a software control means for gradually escalating the voltages from the charged battery power source to activate the CPU (2), a supersonic vibrating unit (50) for operating the vibrating element to produce a multi-stage pulse width, a skin contact detecting device (60) for detecting contact of the vibrating element with a user's skin, a heat-detecting device (70) to detect whether the element is overheated, a switch unit (30) with a main power switch and individual operation switch units, a displayer (40) for indicating the operating mode, a warning unit (80) to alert when the device is in abnormal operation, an auxiliary circuit (90), and a battery voltage-measuring unit (10) for supplying stable power.

Figure 2:
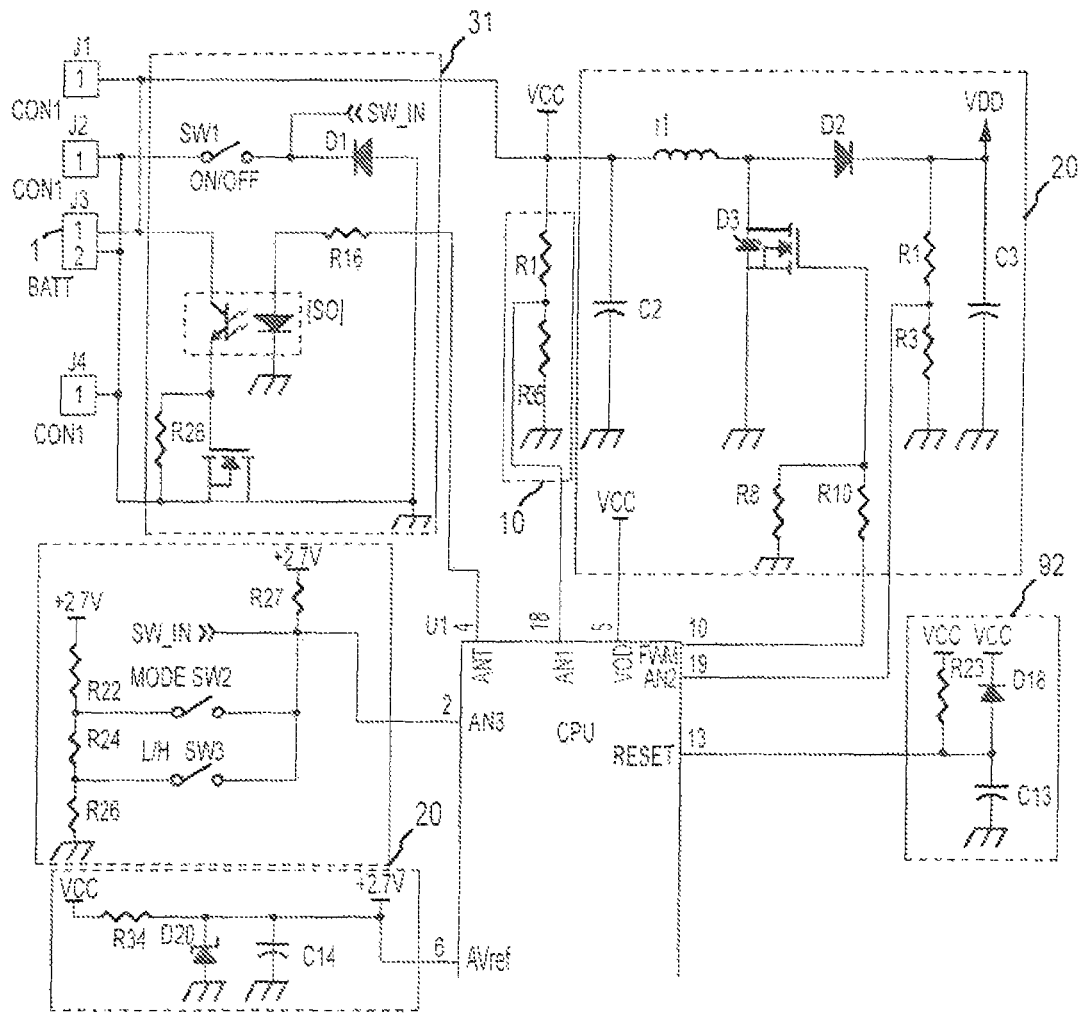
FIG. 2 is a detail of a circuit of a power source and a switch unit of the skin care device according to the present invention.

Referring to FIG. 2, each element of the DC-DC converting unit (20), a switch unit (30) consisting of a first switch unit (31) and a second switch unit (32), and a power source unit consisting of a basic voltage generating unit (91), a reset unit (92) and an auxiliary circuit unit (90) are explained in detail.

An input terminal of the first switch unit (31) is connected in parallel to a pair of charge terminals (J1, J2) of the outer power source and the battery terminal (J3). Another battery terminal (J4) is an extra terminal for changing polarity.

When the main power switch (SW1) is turned on, a switch in the signal (SW_IN) is transmitted to an analogue input terminal (AN5), of CPU (2) through a second switch unit (32) for activating the CPU. Sequentially, the CPU activates the first switch unit (31) through an analogue output terminal (AN7) and the photo-coupler (ISO1) through resistance (R16) for switching the FET (D4).

At this point, battery voltage is measured by the battery voltage-measuring unit (10), which consists of split resistance (R1, R35), and is transmitted to the analogue input terminal (AN1).

On the other hand, because portable skin care devices commonly use a unique power source, such as a battery (for example, 3.6V), a voltage-escalating process is essential to obtain high voltage (for example, a supersonic device 1~15V or an ion inductor 20~30V). Instead of using an expensive microchip as in the conventional DC-DC converter, a switching element (D3), a CPU and a PWM control program are used for adjusting the frequency duty rate and the output power voltage.

When a switching signal is issued from the PWM control terminal (10) of the CPU, the pulse width can be controlled by turning on and off the switching element (D3), and eventually the output voltage and power are controlled.

When a user turns on the main switch of the skin care device and brings it into contact with the skin, the skin contact-sensing device (60) detects the skin touch and transmits a signal to the CPU. Then, the PWM signal prolongs the switch-on activating time to gradually increase the voltage until it reaches the operating voltage at the step-up stage, as seen in FIG. 7(a). Thus, this method, including feedback control, solves the problems borne in the conventional device due to a sudden increase of voltage. As seen in FIG. 7(b), when the device is turned off, the operating voltage is gradually decreased by shortening the pulse width during the switch-off time at the step-down stage. Therefore, it is possible to maintain stable and controlled power for operating the device.

The VDD, which is the actual output voltage of the DC-DC converting unit, is 12-15V for normal operation and 10V for standby operation to save energy.

Split resistance (R2, R3) is matched with the output voltage of the CPU (for example, 3.3V) by sensing the output voltage and transmitting to the analogue input terminal (AN2).

Figure 16:
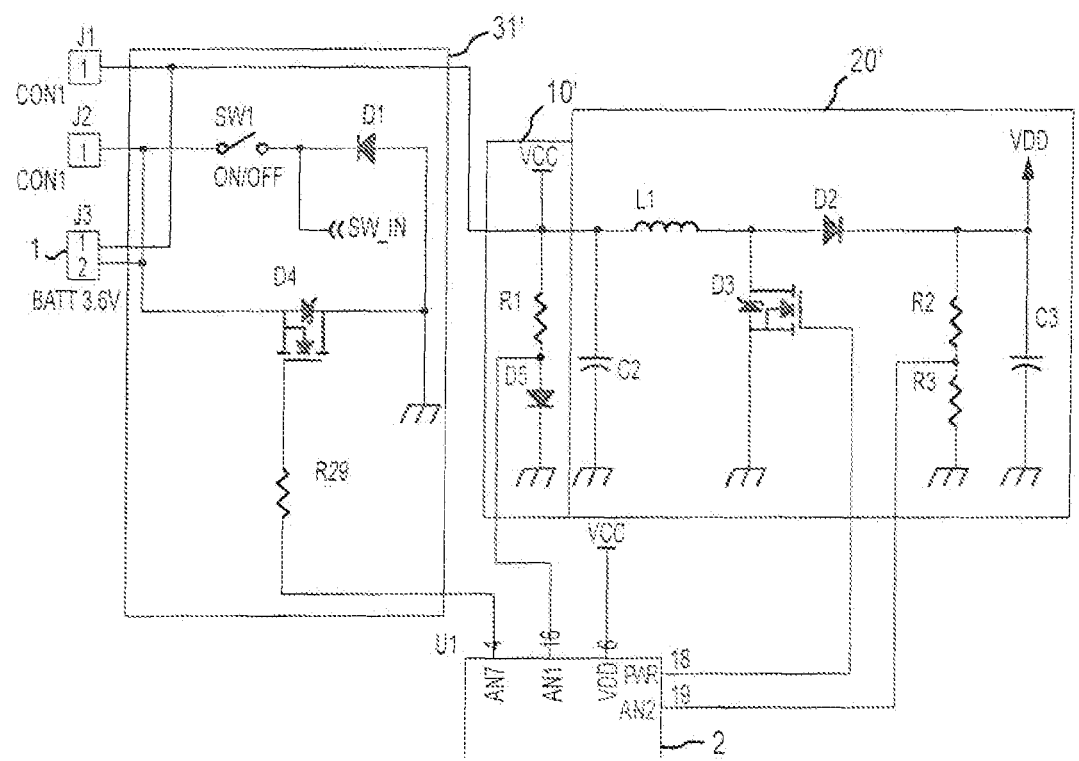
FIG. 16 is a detail of a circuit of the first switching unit for the supersonic ionizing skin care device according to the second embodiment of the present invention.

As seen in FIG. 16, an output signal of the first switch unit (31) transmitted from the output terminal (AN7) of the CPU does not necessarily pass through the photo-coupler (ISO1) when the main switch (SW1) is turned on, because the result is the same as when the FET (D4) is directly connected through resistance (R29 in FIG. 16).

Figure 8:
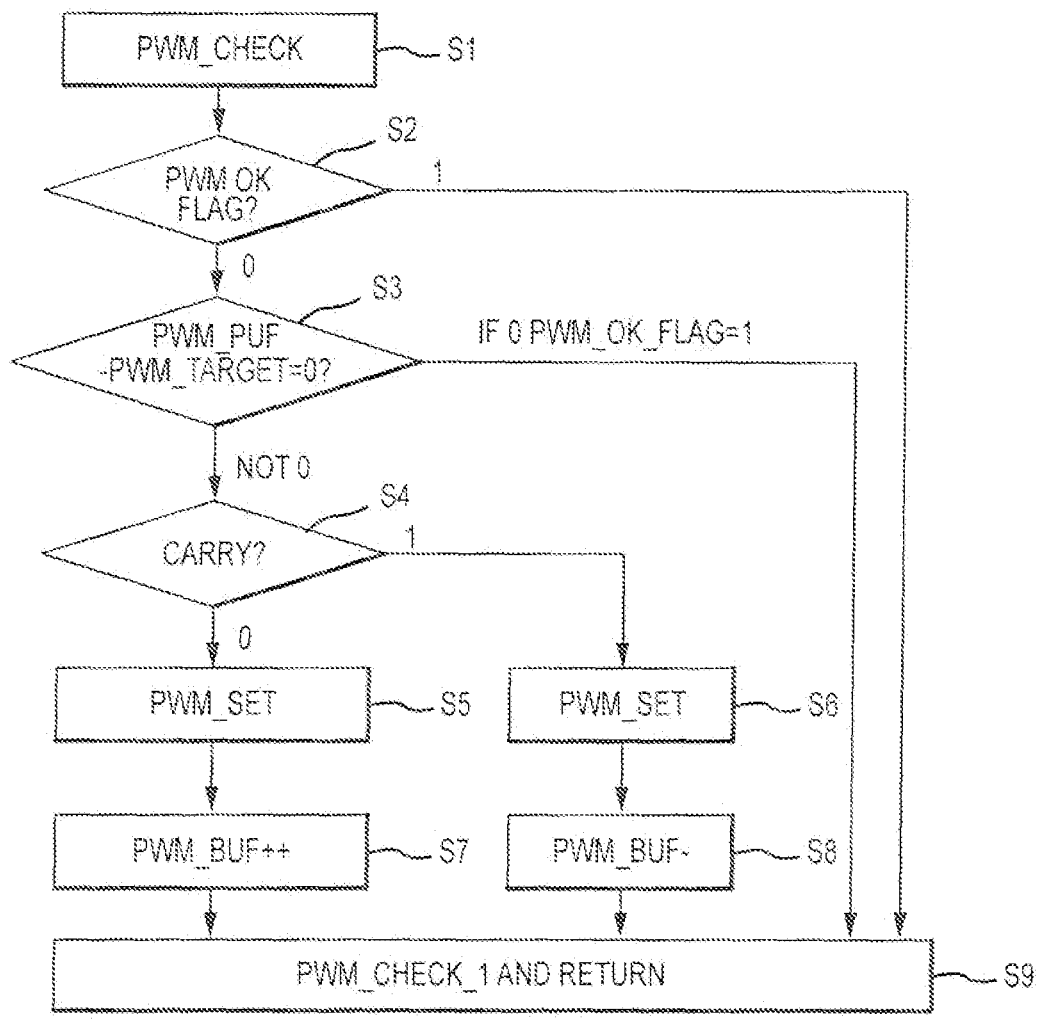
FIG. 8 is a flowchart for controlling the stable voltage of the skin care device according to the present invention.
Figure 9:
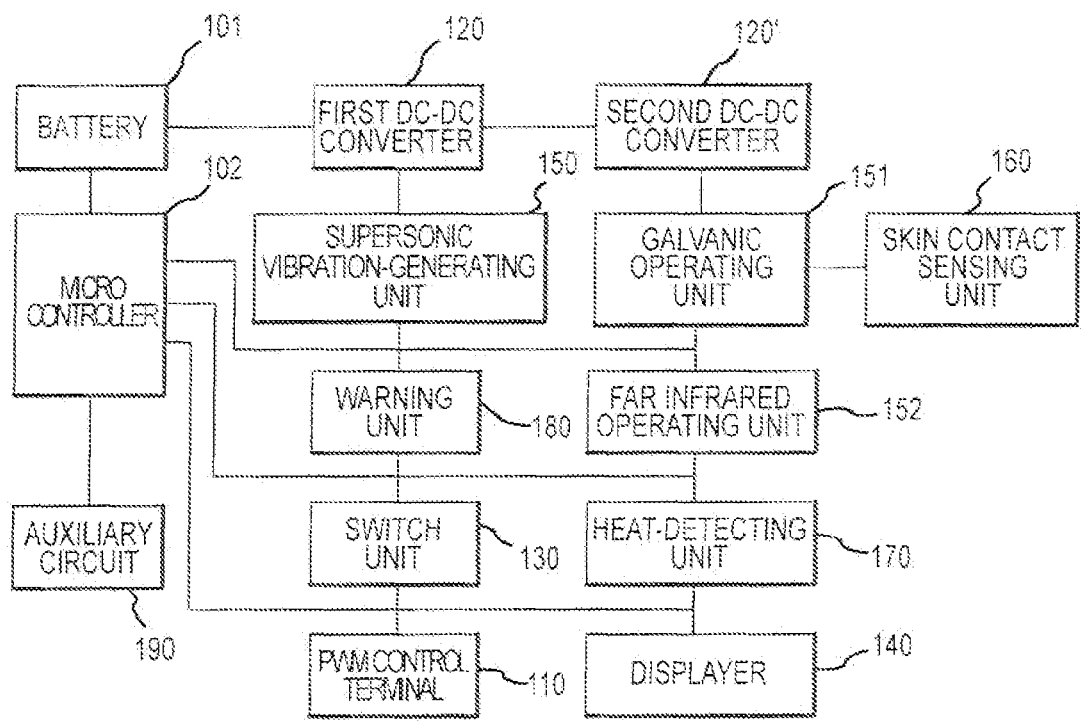
FIG. 9 is an overall block diagram of the supersonic ionizing skin care device according to the second embodiment of the present invention.

Referring to FIG. 8, a flowchart of a power maintenance program is presented for supplying stable power and controlling the CPU. A method for maintaining and supplying stable power comprises the following steps: after setting a certain pulse width, starting a pulse width-checking program (PWM_CHECK) to check the operating pulse width (S1) and determine whether the pulse width is properly operated within the set pulse width (S2). If the checked pulse is operated in the setting pulse width ('PWM OK FLAG'=1), the process is returned to step S9 to continue the operation. If the checked pulse width is not in the setting pulse width, the actual pulse width ('PWM_PUF') is compared with the setting pulse width ('PWM_TARGET) (S3). If the compared pulse width has no difference with the actual and the setting pulse widths (PWM_PUF−PWM_TARGET=0), then the process is returned to S9 to continue operation. Otherwise, a subsequent step S4 or step S8 is initiated for adjusting the PWM.

Next, the duty ratio of the pulse width determines whether the actual operating duty ratio is larger or smaller than that of the setting width (S4). If the detected duty ratio of pulse width is smaller than that of the setting width, a step up (S7) is initiated to increase the setting duty ratio by the amount of the difference in the PWM value between the detected duty ratio and the setting duty ratio (C3). If the detected duty ratio of the pulse width is larger than that of the setting width, a step-down (S8) is initiated to decrease the setting duty ratio by the amount of the difference in the PWM value between the detected duty ratio and the setting duty ratio. Then, the process is returned to S2 to continue the operation.

Through the above pulse width-checking program, it is possible to adjust the strength of output by operating an analogue input switch (SW3) of the skin care device. When a user intends to adjust the strength from weak to strong, the duty ratio is increased by accessing a PWM pulse width signal from the PWM control terminal (pin number 10) to an analogue input terminal (AN5). For example, when a delicate area of the human body, such as the face, is being stimulated, the output of the vibrating device must be gentle. But when a muscle area of the human body, such as a hip or a leg, is being stimulated, the output of the vibrating device must be strong.

The second switch (SW2) in the second switch unit (32) is a mode switch for adjusting the levels of the skin care device. As seen in FIG. 6, each step signal having a proper frequency is issued from each step. Each output pulse signal of the analogue output terminal (R40) of the supersonic generator (50) is transformed to be of proper frequency. For example, the present supersonic skin care device has four step modes, each with a transformed frequency, and two level of high/low adjustment for strength.

On the other hand, such configuration of the second switch (SW2) is possible to apply the various voltages with one input port, which is comprised of a basic voltage generator (91), a reset unit (92), reactor (L1), a condenser (C1, C2), and an anti-inverse diode (D1, D2).

Referring to FIG. 5, a core invention of the present supersonic vibration-generating unit (50) is described in detail.

When a control signal with a proper frequency is issued to the voltage amplifier (51) of the supersonic vibration-generating unit (50) through the output terminal (RA0) of the CPU, the signal is amplified through voltage amplifiers (R15, Q4, Q5, R8, R9, D10), and transmitted to the supersonic vibrator (ULTRA1) as a pressing element of the vibrating unit (52) through the resonance unit (53). When a pulse is added to the vibrator, free vibration occurs. A transistor (Q2) called a resonance tank achieves self-resonance when pulse is added to it. The trans (T1) is amplified to dislocate from the 0 to + direction for generating a vibration by the switching element (Q3, Q6) of the vibration-generating unit (54). Again, pulse is added to the supersonic vibrator (ULTRA1) through the trans (T2) of the vibrating unit (52) for achieving resonance.

For example, when a vibrator operated with 1 MHz frequency is brought into contact with the user's skin, the vibrating element is depressed to interrupt its operation. The interrupted vibration disturbs the electric current in the circuit, and is detected by split resistance (R18, R20) of the electric current sensing unit (61). The sensed faint signal is amplified through the amplifier (62) and input to the analogue input terminal (AN6) for transforming the digital signal. Thus, the DC-DC converting unit (20) of the CPU increases the duty ratio of the output signal to step up the voltage from low to high through the PWM output terminal (pin No. 10). Through this process, the skin care device can be operated with a consistent vibrating strength, even when the vibrating element is depressed. When the skin care device is in idling mode, without stimulating the patient, the supersonic vibrator is automatically set to the lowest level of standby status to save energy.

Figure 3:
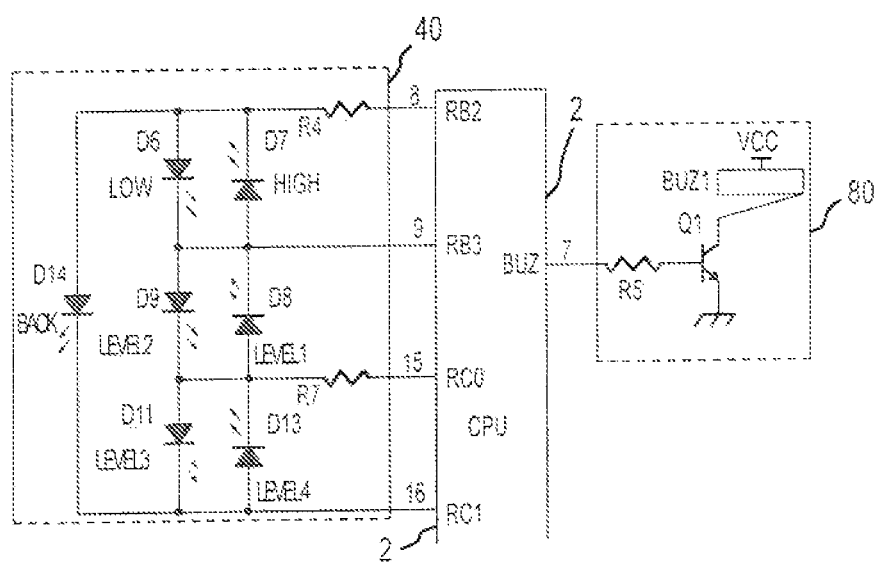
FIG. 3 is a detail of a circuit of an output unit of the skin care device according to the present invention.

Referring to FIG. 3, the display unit (40) and the sound alert unit (80) of the present invention are described in detail. Those systems comprise a first pair of photodiodes (D6, D7) connected in parallel to two ports (RB2, RB3) for displaying the strength of vibration, a second pair of photodiodes (D8, D9) connected in parallel to two ports (RB3, RC0) for displaying the mode controls of the first mode and the second mode, a third pair of photodiodes (D11, D13) connected in parallel to two ports (RC0, RC1) for displaying the mode controls of the third mode and the fourth mode, and a final photodiode (D14) connected in parallel to two ports (RB2, RC1) for displaying the operating status. It is possible to activate multiple diodes with a minimum number of port pins for displaying all of the necessary information. Therefore, the present system can save energy.

An alert sound-generating unit (80, R5, Q1, BUZ1) comprises an operation circuit of a buzzer (BUZ1) for generating an alert sound when the device is in abnormal operating situation.

A Table 1 illustrates the determination of the LED diodes for turning the lighting on and off. For example, when the output of the input-output terminal RB2 (A) is "0" and the output of the input-output terminal RB3 (B) is "1", the LED (D7) is lit on to represent a status of "high mode." If the output of the input-output terminal RB3 (B) is "0" and the output of the input-output terminal RC0 (C) is "1", the LED (D8) is lit on to represent a status of "Level 1 mode." If the output of the input-output terminal RC0 (C) is "0" and the output of the input-output terminal RC1 (D) is "1", the LED (D13) is lit on to represent a status of "Level 4 mode." If the output of the input-output terminal RB2 (A) is "1" and the output of the input-output terminal RC1 (D) is "0", the LED (D14) is lit on to represent a status of "contacted on the skin mode."

TABLE 1

| Led | Port | | | |
| --- | --- | --- | --- | --- |
| | A | B | C | D |
| High | 0 | 1 | x | x |
| Low | 1 | 0 | x | x |
| Level 1 | x | 0 | 1 | x |
| Level 2 | x | 1 | 0 | x |
| Level 4 | x | X | 0 | 1 |
| Level 3 | x | X | 1 | 0 |
| Back | 1 | X | x | 0 |

Each port is able to select input or output.
1: the output status of the port with the output value of "1",
0: the output status of the port with the output value of "0", and
x: the input status of the port with no value.

Figure 4:
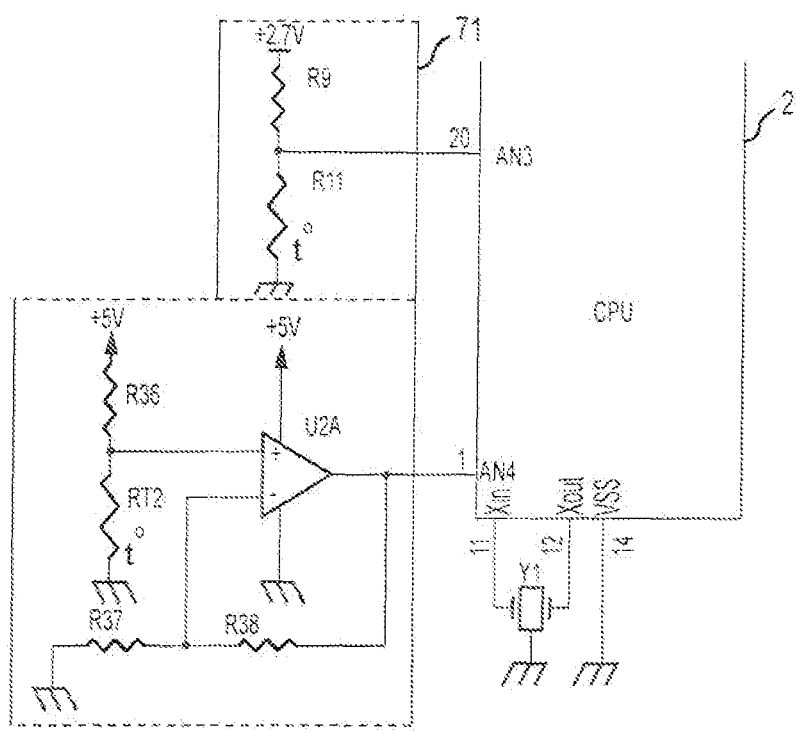
FIG. 4 is a detail of a circuit of a heat-detecting unit of the skin care device according to the present invention.

Referring to FIG. 4, the heat-sensing unit (70) comprises a first heat sensor (71) and a second heat sensor (72). The first heat sensor (71) consists of a thermo-starter (RT1), and a split resistor (R19) detects the surface temperature of the vibrating plate and transmits the detected signal to the CPU through an analogue input terminal (AN3). Due to the high frequency of vibration, the supersonic vibrator is easily overheated to a temperature that would harm human skin (for example 45° C.). Therefore, it is necessary to control the duty ratio of the pulse wave (PWM) for preventing overheating.

The second heat sensor (72) consists of a second thermo-starter (RT2), and a second split resistor (R36) detects the temperature of transistors (Q3, Q6) in a vibration-generating unit (54) and transmits the detected faint signal to an analogue input terminal (AN4) through amplifiers (R37, R38, U2A). Through the sensing unit, the vibration-generating unit (54) can be prevented from overheating by controlling the duty ratio of the pulse wave (PWM).

Figure 13:
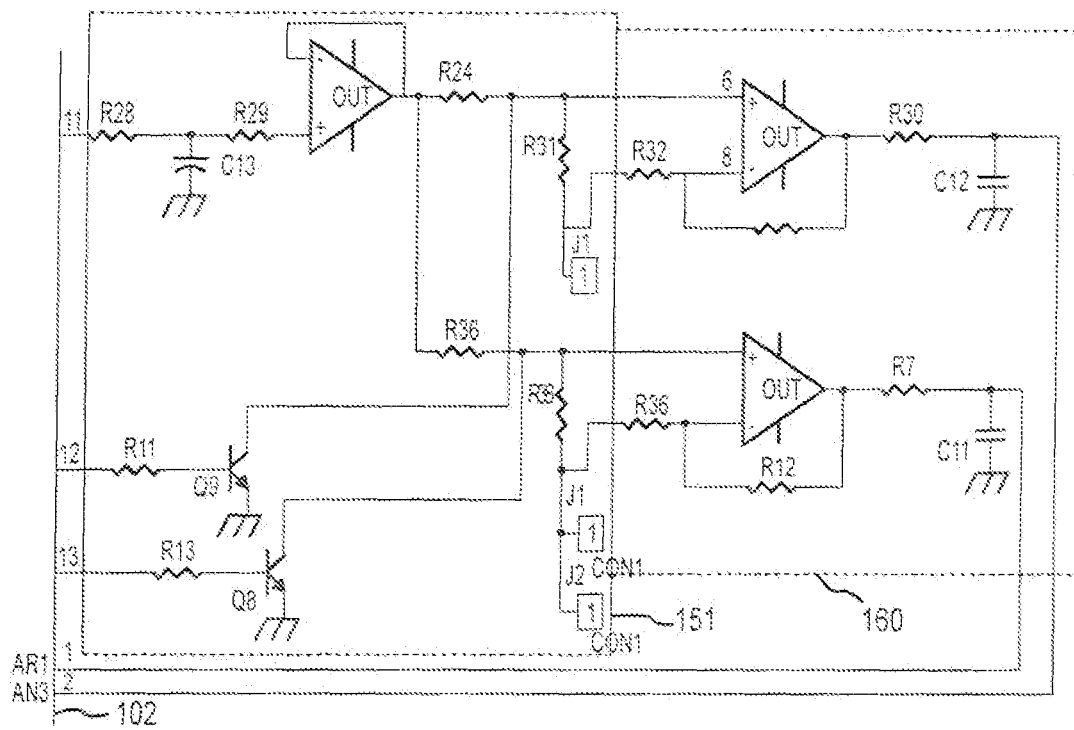
FIG. 13 is a detail of a circuit of the galvanic operating unit for the supersonic ionizing skin care device according to the second embodiment of the present invention.
Figure 14:
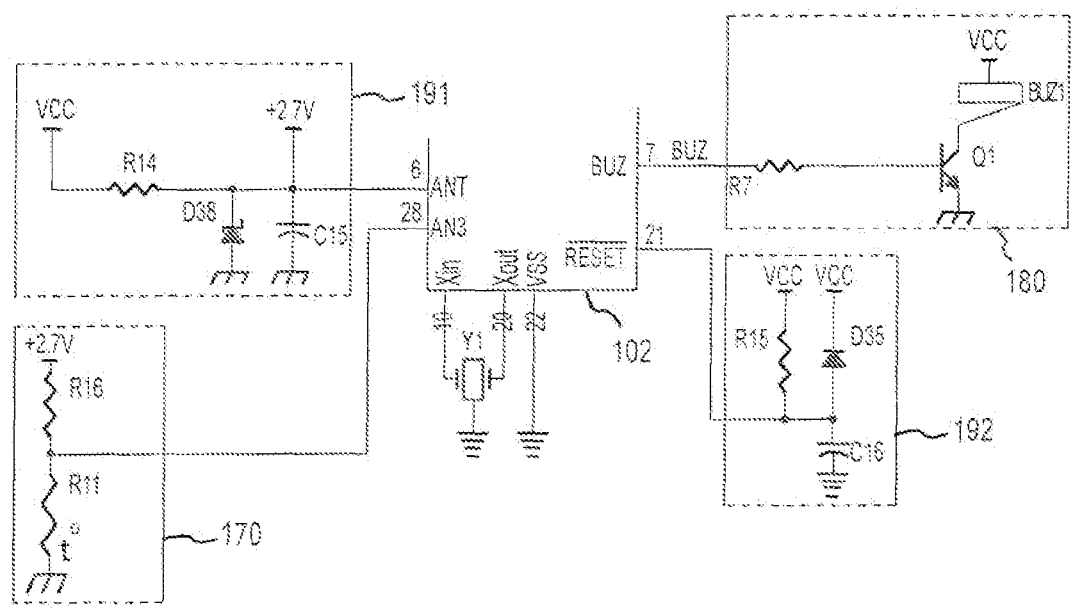
FIG. 14 is a detail of a circuit and the auxiliary circuit of a heat-detecting device for the supersonic ionizing skin care device according to the second embodiment of the present invention.
Figure 15:
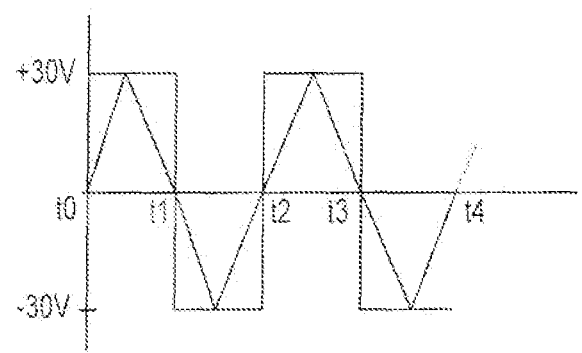
FIG. 15 illustrates a pulse wave applied to the galvanic operating unit of the supersonic ionizing skin care device.

Referring to FIGS. 9 to 15, a set of drawings illustrates an overall block diagram of the supersonic ionizing skin care device of the second embodiment (FIG. 9), a detail of a circuit of a power source and a switch unit (FIG. 10), a detail of a circuit of a displaying unit (FIG. 11), a detail of a circuit of the supersonic vibrating unit and the infrared unit (FIG. 12), a detail of a circuit of the galvanic operating unit (FIG. 13), a detail of a circuit and an auxiliary circuit of the heat-detecting device (FIG. 14), and a pulse wave applied to the galvanic operating unit of the supersonic ionizing skin care device (FIG. 15).

According to the supersonic ionizing skin care device of the second embodiment, the battery voltage (for example, 3.6V) is escalated to 12~15V by the first DC-DC converter (20), in the same way as in the first embodiment. However, it is escalated to 30V by the second DC-DC converter (120') to help the galvanic ion penetrate into the skin.

When the main switch is turned on, the DC-DC converter (120) is activated through a first switch (131) in the same was as in the first embodiment, but the difference in the first switch (131) of the second embodiment is that the main switch (SW1) delivers basic voltage (Vcc).

Figure 10:
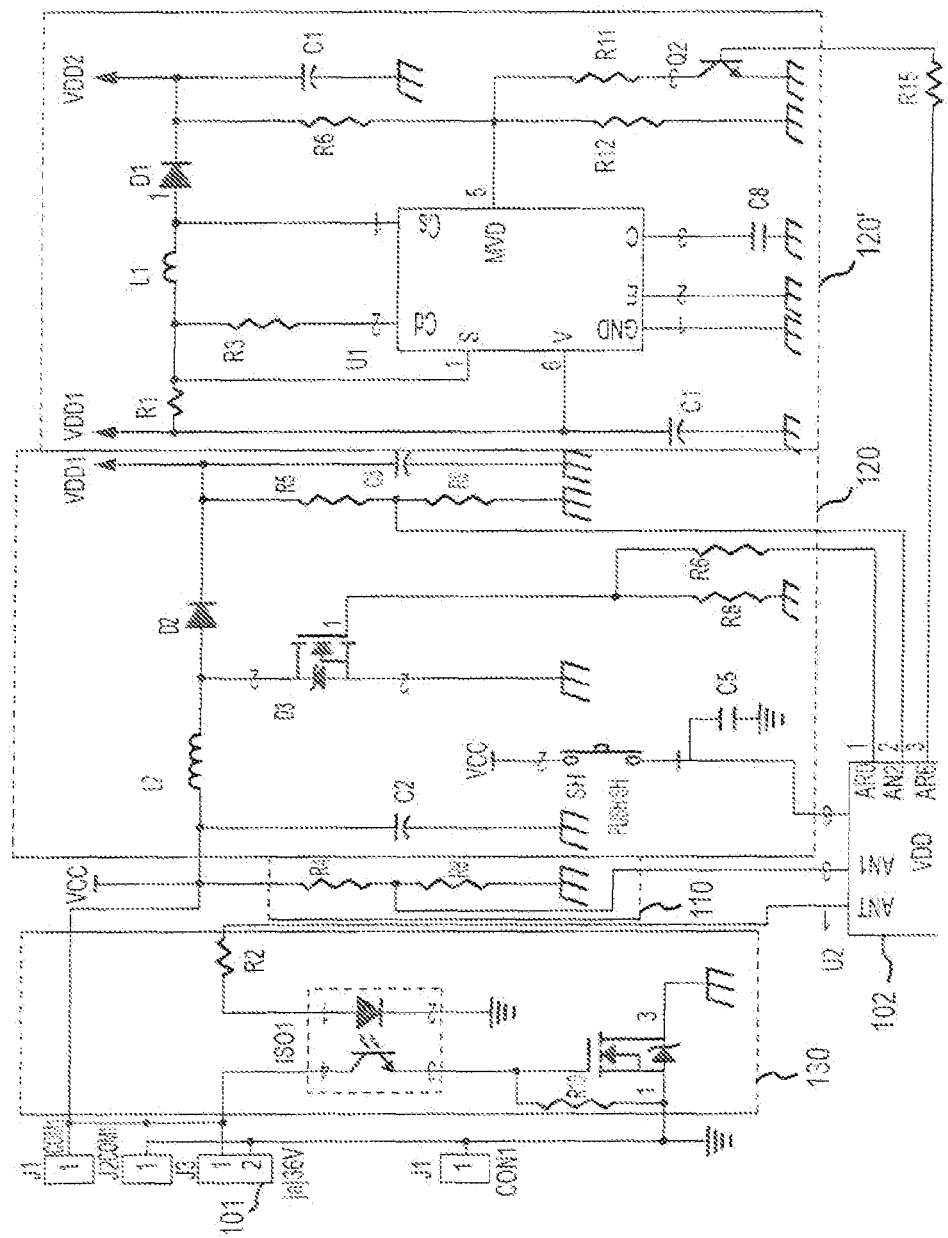
FIG. 10 is a detail of a circuit of a power source and a switch unit for the supersonic ionizing skin care device according to the second embodiment of the present invention.

As shown in FIG. 10, the second DC-DC converter (120') can be used a DC-DC converter chip (U1). A signal from the sixth analogue output terminal (AN6) of the micro-controller (102) activates the DC-DC converter chip (U1) by the switching transistor (Q2) through the resistor (R15). The circuit also includes the elements (Resistor: R1, R3, R6, R11, R12, Capacity: C1, C4, C6, Inductor: L1, Diode: D1).

Figure 11:
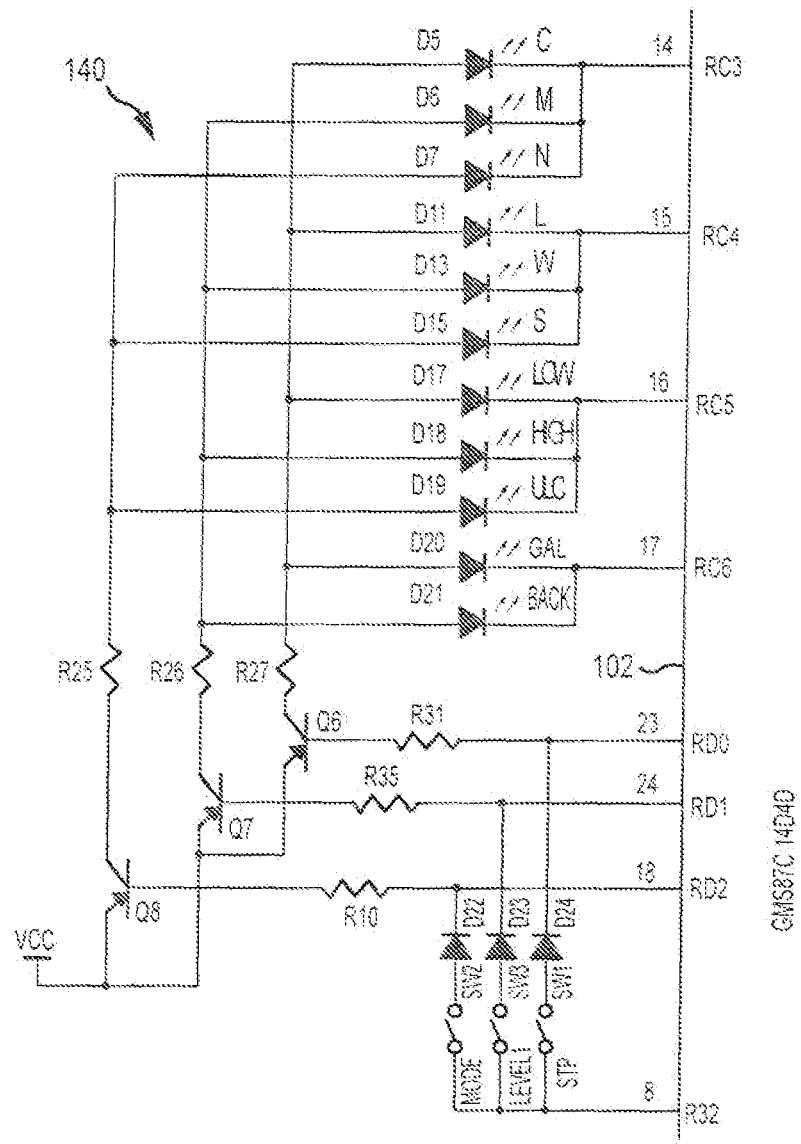
FIG. 11 is a detail of a circuit of a displaying unit for the supersonic ionizing skin care device according to the second embodiment of the present invention.

Referring to FIG. 11, the displaying unit (140) of the second embodiment is described in detail. The input-output terminals (RD0, RD1, RD2) of the micro-controller (102), along with the input-output terminal of RB2, have a function of input terminals for checking the input of the second to fourth switches (SW2, SW3, SW4). It also has a function of an output terminal for activating each displaying LED (D5-D7; D11, D13, D17-D19: D20, D21) along with the switching transistors (Q6, Q7, Q8).

Figure 12:
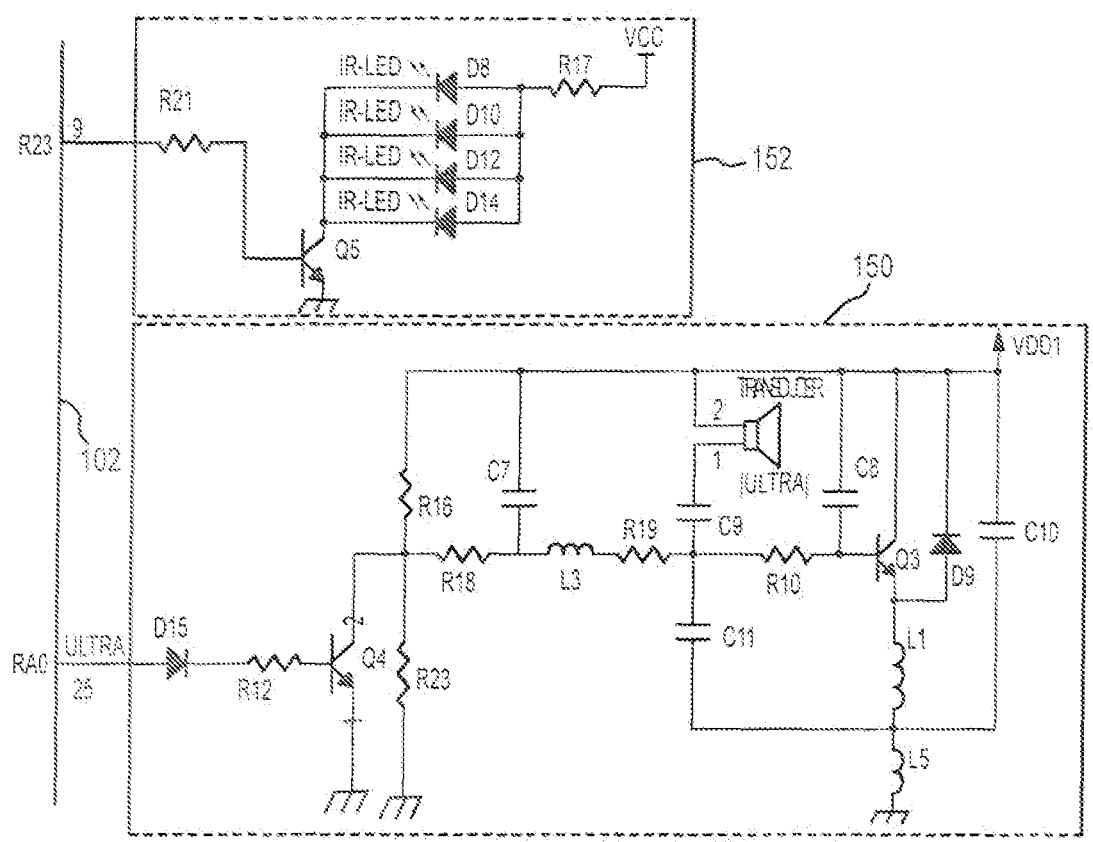
FIG. 12 is a detail of a circuit of the supersonic vibrating unit and the infrared unit for the supersonic ionizing skin care device according to the second embodiment of the present invention.

Referring to FIG. 12, a supersonic operating unit (150) and a far infrared operating unit (152) of the second embodiment are described in detail. The supersonic operating unit (150) activates a resonance transistor (Q3) and a supersonic vibrator (ULTRA1) by accessing a control signal from an output terminal (RA0) of the micro-controller (102) to a switching transistor (Q4) through a diode (D16) and resistance (R22). The circuit of the units consist of elements R16, R18-R20, R23, L3-L5, C7-C11, D9 and transistors (Q3, Q4).

The far infrared operating unit (152) activates the far infrared LED (D6, D10, D12, D14) connected to the basic voltage (Vcc) through the resistor (R17) by accessing a control signal from an output terminal (RB3) of a micro-controller (102) to a switching transistor (Q5) through a resistance (R21).

Referring to FIG. 13, a galvanic operating unit (151) of the second embodiment is described in detail, as follows. The galvanic operating unit (151) controls a face-contact electrode (J4) and a hand-contact electrode (J5, J6) through each resistor (R31, R38) to access the DC voltage being converted by the pulse wave control signal from an output terminal (PWM1) of a micro-controller (102) through a comparison circuit (U3A, R24, R28, R29, R36, C13).

At this point, a PWM control signal from an input-output terminal (RB6, RB7) of a micro-controller (102) transmits to the PWM controlling transistor (Q9, Q10) through each resistance (R41, R43). Each port of the PWM controlling transistor (Q9, Q10) is connected to each face- and hand-contact electrode to output pulse depending on the PWM control signal. When a signal of the port RB7 is set to "high", the transistor (Q10) is in the "on" status and connected to a hand signal contact electrode to output between t0 and t1, as seen in FIG. 15. To the contrary, when a signal of the port RB6 is set to "high", the transistor (Q9) is in the "on" status and connected to a face signal contact electrode to output between t1 and t2, as seen in FIG. 15. Therefore, the current flows to hand- or face-contact electrodes, alternatively, to help the galvanic active material penetrate into the skin.

It is also equipped with a skin contact sensing unit (160) for sensing skin contact with the vibrator. The sensed signal is transmitted for amplification through amplifying circuits (U3B, U3c, R30, R32, R37, R39, C12, C14) and input to the micro-controller (102) through an analogue input port (AN4, AN5), as seen in FIG. 13.

As seen in FIG. 14, a heat-sensing unit (170) comprises a first heat sensor with a thereto-starter (RT1) and a split resistor (R46) to detect the surface temperature of the supersonic vibrating plate. It also comprises a sound alert unit (180), a basic voltage generating unit (191), and a reset (192).

As discussed above, the skin care device of the present invention provides an apparatus and a method for maintaining and supplying stable power and smoothly escalating voltages to save energy.

It also provides a main switch system to avoid energy waste due to the rapid voltage increase of conventional devices.

It also provides various operating modes and strengths to effectively stimulate the skin, depending on the user's requirement.

It is also equipped with a skin contact sensing unit and a heat-sensing unit to protect the skin from possible burning due to accidental overheating.

The present invention is also equipped with an LED display device with a minimum number of connecting pins.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A portable skin-care device having an ion penetration function to penetrate an ionized substance underneath the skin, and a displaying function, comprises:
    a DC-DC converting unit for escalating an input voltage,
    a galvanic operating unit controlled by a Central Processing Unit (CPU) to access a galvanic current to a contacting probe, and activated by the escalated input voltage from the DC-DC converting unit,
    a switch unit for switching the operating mode of said galvanic operating unit,
    a skin contact sensing unit for detecting skin contact with a probe of said galvanic operating unit by sensing a current in the probe, and
    a heat-sensing unit and a safety control function for rapidly shutting off power when an unusual operation is detected due to at least one of overheating and an electric hazard.

2. A skin-care device having an ion penetration function as claimed in claim 1, further comprises a supersonic generating unit controlled by said CPU for generating supersonic vibration.

3. A skin-care device having an ion penetration function as claimed in claim 1, further comprises a far infrared generating unit controlled by said CPU for generating a far infrared beam.

4. A skin-care device having an ion penetration function as claimed in claim 1, further comprises a contacting element for simultaneously vibrating and penetrating formed a solid piece.

* * * * *